(12) United States Patent
Gupta et al.

(10) Patent No.: US 9,184,685 B2
(45) Date of Patent: Nov. 10, 2015

(54) WIND TURBINE GENERATOR

(75) Inventors: Amit Kumar Gupta, Singapore (SG); Anshuman Tripathi, Singapore (SG); Gil Lampong Opina, Singapore (SG); Yugarajan Karuppanan, Singapore (SG); Liang Yang, Singapore (SG); Ji Qian, Singapore (SG)

(73) Assignee: Vestas Wind Systems A/S, Aarhus N (DK)

( * ) Notice: Subject to any disclaimer, the term of this patent is extended or adjusted under 35 U.S.C. 154(b) by 197 days.

(21) Appl. No.: 13/882,149

(22) PCT Filed: Oct. 25, 2011

(86) PCT No.: PCT/DK2011/050403
§ 371 (c)(1),
(2), (4) Date: Aug. 9, 2013

(87) PCT Pub. No.: WO2012/055416
PCT Pub. Date: May 3, 2012

(65) Prior Publication Data
US 2013/0313826 A1     Nov. 28, 2013

Related U.S. Application Data

(60) Provisional application No. 61/407,631, filed on Nov. 23, 2010.

(30) Foreign Application Priority Data
Oct. 28, 2010    (DK) ................................ 2010 70460

(51) Int. Cl.
*H02P 9/00*     (2006.01)
*H02H 7/06*     (2006.01)
*H02M 1/32*     (2007.01)

(52) U.S. Cl.
CPC ............... *H02P 9/006* (2013.01); *H02H 7/065* (2013.01); *H02M 1/32* (2013.01); *Y02E 10/76* (2013.01)

(58) Field of Classification Search
CPC .................................... H02P 9/006; H02P 9/10
USPC ........... 322/28; 290/44, 55; 700/286, 288, 290
See application file for complete search history.

(56) References Cited

U.S. PATENT DOCUMENTS

| 5,402,058 | A | 3/1995 | Larsen | |
|---|---|---|---|---|
| 2006/0267560 | A1* | 11/2006 | Rajda et al. | 323/209 |
| 2007/0024059 | A1* | 2/2007 | D'Atre et al. | 290/44 |

(Continued)

FOREIGN PATENT DOCUMENTS

| EP | 1499009 A1 | 1/2005 |
|---|---|---|
| EP | 2293431 A2 | 3/2011 |

(Continued)

OTHER PUBLICATIONS

International Search Report and Written Opinion; Mar. 15, 2012; PCT/DK2011/050403.
Search Report and Opinion (Danish Patent & Trademark Office); May 18, 2011; PA 2010 70460.

*Primary Examiner* — Tulsidas C Patel
*Assistant Examiner* — Sean Gugger
(74) *Attorney, Agent, or Firm* — Patterson & Sheridan, LLP

(57) ABSTRACT

A system for a wind turbine generator comprising: a set of voltage limiting elements, and a controller configured to bypass the voltage limiting elements when a line voltage is below a predetermined threshold, and configured to connect each voltage limiting element in series between a grid side converter and a turbine transformer of the wind turbine generator, and to determine a current control reference signal for controlling the grid side converter (to generate a determined current) when the line voltage is above the predetermined threshold.

16 Claims, 12 Drawing Sheets

(56) References Cited

U.S. PATENT DOCUMENTS

| | | |
|---|---|---|
| 2008/0157529 A1 | 7/2008 | Rivas et al. |
| 2009/0001725 A1* | 1/2009 | Llorente Gonzalez et al. .. 290/44 |
| 2009/0096211 A1* | 4/2009 | Stiesdal ................ 290/44 |
| 2010/0308586 A1* | 12/2010 | Frank et al. ............ 290/44 |
| 2011/0057444 A1* | 3/2011 | Dai et al. .............. 290/44 |
| 2011/0074364 A1* | 3/2011 | Nakajima et al. ........ 322/19 |

FOREIGN PATENT DOCUMENTS

| | | |
|---|---|---|
| WO | 03058789 A1 | 7/2003 |
| WO | 2005015012 A1 | 2/2005 |
| WO | 2006127844 A2 | 11/2006 |

* cited by examiner

WIND TURBINE GENERATOR

FIELD OF THE INVENTION

The present invention relates to a system and/or a method for a wind turbine generator (WTG).

BACKGROUND OF THE INVENTION

Wind farms are commonly located in remote areas to take advantage of good wind conditions. This may require long transmission lines to connect the wind farms to the rest of the power grid. Because of the long transmission lines and extreme conditions in the remote areas the wind farms may have to be designed to withstand relatively high levels of fault conditions, this is also necessary in order to ensure good connectivity with the grid. Overvoltage is one such fault condition which should be handled properly.

In W. Sweet, "Danish Wind Turbines Take Unfortunate Turn", *IEEE Spectrum*, vol. 41, no. 11, pp. 30, 2004 it was reported that on the west coast of Denmark an offshore wind farm called Horns Rev 1 connected by an undersea cable experienced temporary overvoltages (TOV) as high as 2 p.u. when the main-circuit breaker tripped at the on-land connection point and left the wind farm in isolated operation with the cable and the wind farm transformer.

In W. Wiechowski, J. C. Hygebjerg and P. Børre Eriksen,— Higher Frequency Performance of AC Cable Connections of Offshore. *7th int. Conf. on Large Scale Integration of Wind Power and on Transmission Networks for Offshore Wind Farms*, pp. 211-217, 2008 it was reported the Danish transmission system operator, Energinet.dk, performed investigations of such overvoltage in connection with the planning of the new offshore wind farm Horns Rev 2. These investigations have shown that the overvoltage levels are influenced by many parameters, including operational characteristics of the wind turbine generator (WTG) prior to the disconnection, protection systems, control and the accuracy of the representation of the cable and the transformers in the relevant frequency range.

In each country the grid code specifies what fault conditions a wind farm must be designed to withstand before tripping. This directly affects the design of the WTG. As shown in FIG. 1, the dotted curve 1 corresponds to Australia where the temporary overvoltage up to 1.6 pu can be experienced. For Canada the overvoltage in FIG. 1 could be up to 2 pu for a short duration. In FIG. 1 if we do not consider Canada and Australia, the solid curve 2 covers temporary overvoltage grid requirement for all other countries.

Wind farm owners and wind turbine manufacturers may wish to protect the power electronics and power components in converter systems of wind turbines from damage caused by the overvoltage. The easiest solution to protect the turbines is by disconnection from the grid. However, transmission system operators may want to maintain grid connectivity of wind farm in case of overvoltage. Thus the relevant grid code may require the turbine to stay connected to the grid during such overvoltage events.

International patent publication number 03/058789 discloses a number of current limiters in the form of series impedances in parallel with power electronic switches. The current limiters operate independently for the respective phase when the line current in that phase is above a predetermined limit. During the fault condition, the power control is disabled, enabling voltage control with a fast current controller. In this publication, the series resistors seem to absorb most of the active power in the fault conditions which makes them bulky. This problem appears to be more serious with growing size of the WTGs.

SUMMARY OF THE INVENTION

In general terms the invention proposes using a current control strategy for a WTG during an overvoltage condition. This may have the advantage that the power components of the WTG are not damaged, that the WTG is able to stay connected to the grid during the overvoltage event. The series resistors may be used for pre-charge operation of the DC-link capacitors if required.

In a first specific expression of the invention there is provided a system for a wind turbine generator comprising:
  a set of voltage limiting elements, and
  a controller configured to bypass the voltage limiting elements when a line voltage is below a predetermined threshold, and configured to connect each voltage limiting element in series between a grid side converter and a turbine transformer of the wind turbine generator, and to determine a current control reference signal for controlling the grid side converter (to generate a determined current) when the line voltage is above the predetermined threshold.

The controller may be configured to determine the current control reference signal according to at least one of an impedance of the voltage limiting elements, the line voltage, a grid side converter voltage and a grid frequency.

The controller may be configured to shut down the wind turbine generator if the line voltage is above the predetermined threshold for longer than a predetermined period.

Each voltage limiting element may comprises a resistor in parallel with a bypass switch.

Each voltage limiting element may further comprise a switch in series with the resistor.

The controller is configured to open the bypass switch and close the switch in series with the resistor when the line voltage is above the predetermined threshold.

The wind turbine may be multiphase, the gate terminals of series connected switch for each phase may be coupled together and the gate terminals of each bypass switch for each phase may be coupled together and the bypass switches may be simultaneously operated using one gating signal and the series switches may be simultaneously operated using one switching signal.

A wind turbine generator comprising:
  an electrical generator configured to generate AC signals;
  a generator side convertor configured to convert or rectify the AC signals from the AC generator to DC signals to a DC-link,
  a grid side converter configured to convert the DC signals from the DC-link to a fixed frequency AC signal,
  a turbine transformer configured to transform the fixed frequency AC signal to a suitable voltage level, and
  a system according to the above wherein each voltage limiting element is placed between the grid side converter and the turbine transformer.

The controller may be configured to supply reactive currents required by a filter capacitor bank between the grid side converter and the turbine transformer either by the grid side converter or the grid.

The wind turbine generator may further comprise a dump load resistor, and the controller may be configured to connect the dump load resistor to the DC-link according to a duty cycle determined based a power to be dissipated when the line voltage is above the predetermined threshold.

In a second specific expression of the invention there is provided a method of controlling a wind turbine generator comprising:

determining if there is an overvoltage;
if there is an overvoltage over a predefined threshold:
providing an open signal to a set of resistor bypass switches, thereby connecting a set of resistors between a power converter of the wind turbine generator and a grid; and
determining a current control reference signal for controlling the power converter to deliver a determined current, thereby allowing the wind turbine generator to remain connected to the grid throughout the overvoltage.

A pulse width modulated drive signal may be provided to a load dump resistor switch when it is determined during an overvoltage that there is an excess active power which cannot be delivered to the grid.

The method may further comprise providing a complementary close signal to a set of series resistor switches simultaneously with the open signal.

The current control reference signal may be at least one of an active and a reactive current control reference signal.

The method may further comprise determining a reactive current control reference signal to control the overvoltage by absorbing reactive power if the overvoltage is between a lower threshold and the maximum threshold.

The current control reference signal may be determined based on at least one of the overvoltage, a voltage limiting impedance value, a grid side converter voltage and a grid frequency.

BRIEF DESCRIPTION OF THE DRAWINGS

In order that the invention may be fully understood and readily put into practical effect there shall now be described by way of non-limitative example only, an example embodiment described below with reference to the accompanying illustrative drawings in which.

DESCRIPTION OF EMBODIMENTS

A WTG generally includes a set of blades, a generator and a power converter. The turbine blades are rotated about a shaft by the wind and are mounted in a nacelle on a tower relatively high off the ground to ensure good airflow. The electrical generator is driven by the rotating shaft to produce typically alternating current (AC) voltage which varies in magnitude and frequency according to the wind speed. A gearbox may be used to step up the slow rotational speed of the shaft to a high rotational speed suitable for operating the generator. The generator may either be synchronous or asynchronous. The power convertor converts and transfers power from the generator to the grid as described below.

Figure 1:
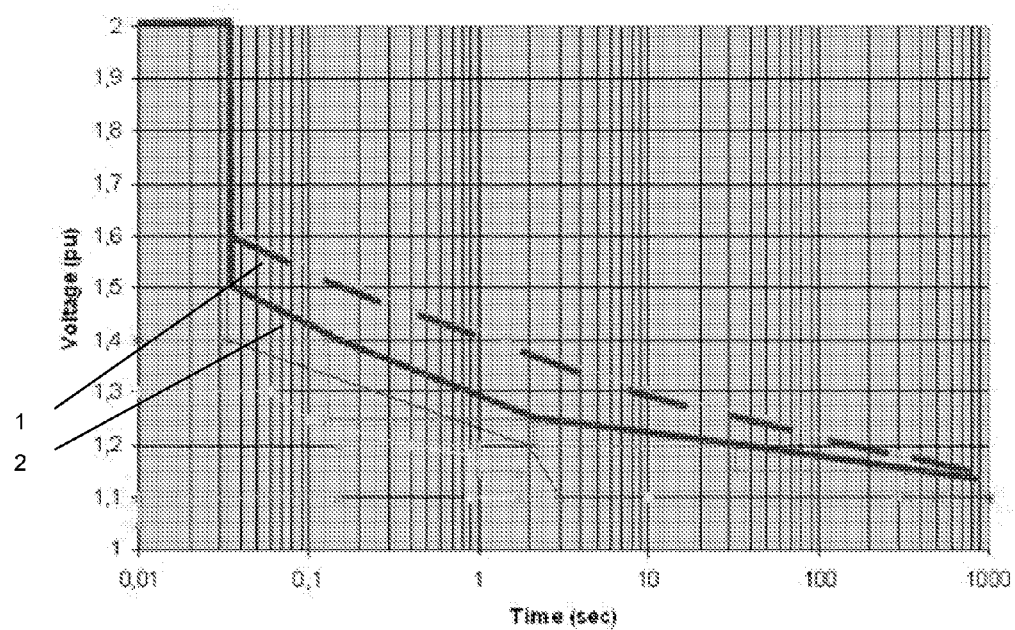
FIG. 1 shows plots of the grid overvoltage w.r.t. time that a WTG may comply with according to grid codes.
Figure 2:
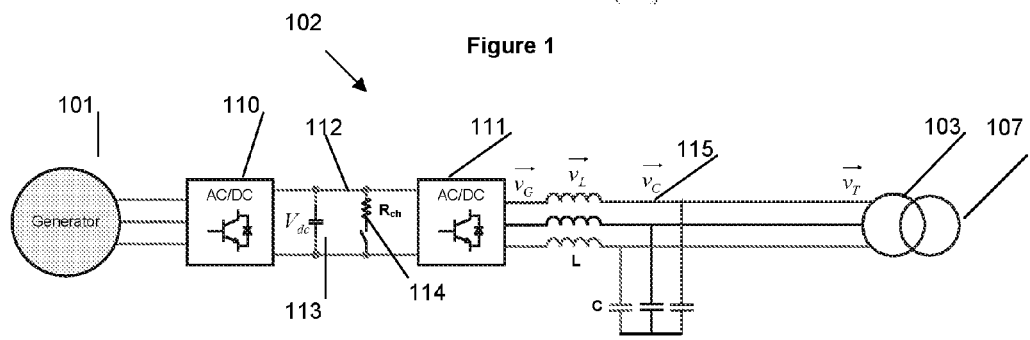
FIG. 2 is an electrical schematic of a drive train system for a full scale converter based WTG.

FIG. 2 shows an electrical system of the wind turbine according to an embodiment. The electrical system includes a generator 101, a power converter 102 and a main transformer 103. The power converter 102 includes a generator-side converter 110 and a grid-side converter 111 connected via a direct current (DC) link 112. The DC-link 112 includes a DC-link capacitor 113. The generator 101 converts mechanical energy to electrical energy having AC (alternating current) voltage and current (collectively referred to as "AC signals"), and provides the generated AC signals to the generator-side converter 110. The AC signals from the generator have a variable frequency, due to varying wind. The generator-side converter 110 converts or rectifies the AC signals to a DC (direct current) voltage and a DC current (collectively know as "DC signals") towards the DC-link 112. A load dump resistor $R_{CH}$ and switch $S_{CH}$ 114 is provided to control the DC voltage on the DC-link 112 by absorbing any excess amount of active power. The grid-side converter 111 converts the DC signals from the DC-link 112 into fixed frequency AC signals for a power grid 107. The transformer 103 transforms the grid voltage to a suitable level on the low voltage side according to the drive train system hardware design. The power output of the grid-side converter 111 is fed to the power grid 107 through main transformer 103. The transmissions lines may be connected directly to the grid or, if in a wind farm, join with other transmission lines at a point of common connection before connecting to the grid. Filters 115 in the form of capacitors, inductors and resistors are also located between the grid-side converter 111 and the power grid 102. Normally, a passive filter carries two branches: a main harmonic filter branch (capacitor banks) to absorb harmonics and a resonance branch (capacitors, small chokes and small resistors) to damp resonance phenomenon. The filter may also include other components such as contactors, fuses, sensors etc.

It should be noted that the electrical system described with reference to FIG. 2 is only an example of the electrical configuration of the wind turbine and only the main components are shown to illustrate the embodiments. The present invention should not be limited to the exact electrical system configuration shown in FIG. 2. Other electrical configurations are possible. Also, many components in the electrical system of the wind turbine are not shown in FIG. 2. For example, the electrical system may include filters between the generator 101 and the power converter 102. Also, there may be switches arranged at various locations for connecting or disconnecting certain components of the turbine. Controllers for controlling the converters 110, 111 are also not shown in FIG. 2.

Generally the power generated by the WTG is determined by power reference or wind speed. However it may be desirable for the WTG to vary the amount of reactive power that is exchanged with the grid to provide better support to the grid. For example during steady state or normal conditions the grid will usually benefit from the WTG exchanging reactive power to meet the demanded power factor. The amount of reactive power support is determined by the grid requirements especially as demanded by the power plant or the grid operator. In the low voltage grid fault conditions typically the reactive power is provided from the WTG to boost up the grid voltage. Whereas in the high voltage grid fault conditions typically the reactive power is absorbed by the WTG to reduce the grid voltage.

During overvoltage condition, it may also be desirable for the converter system to change its configuration to support the grid for the stability. Various terms which will be used in further explanation of the proposed idea are explained below.

$v_G$=Grid side converter output voltage
$v_L$=Voltage drop across grid choke
$v_C$=Voltage at capacitor terminals
$v_T$=Voltage at transformer low voltage terminals The nominal voltage range is typically in the range of 0.9-1.1 pu. However, nominal voltage range and overvoltage level changes from country to country. A line voltage value which exceeds a nominal voltage range can be classified as an overvoltage. In order to comply with the grid code mentioned above, the WTG should be able to operate in spite of overvoltage event for certain duration. A method to handle overvoltage is described below.

Figure 3:
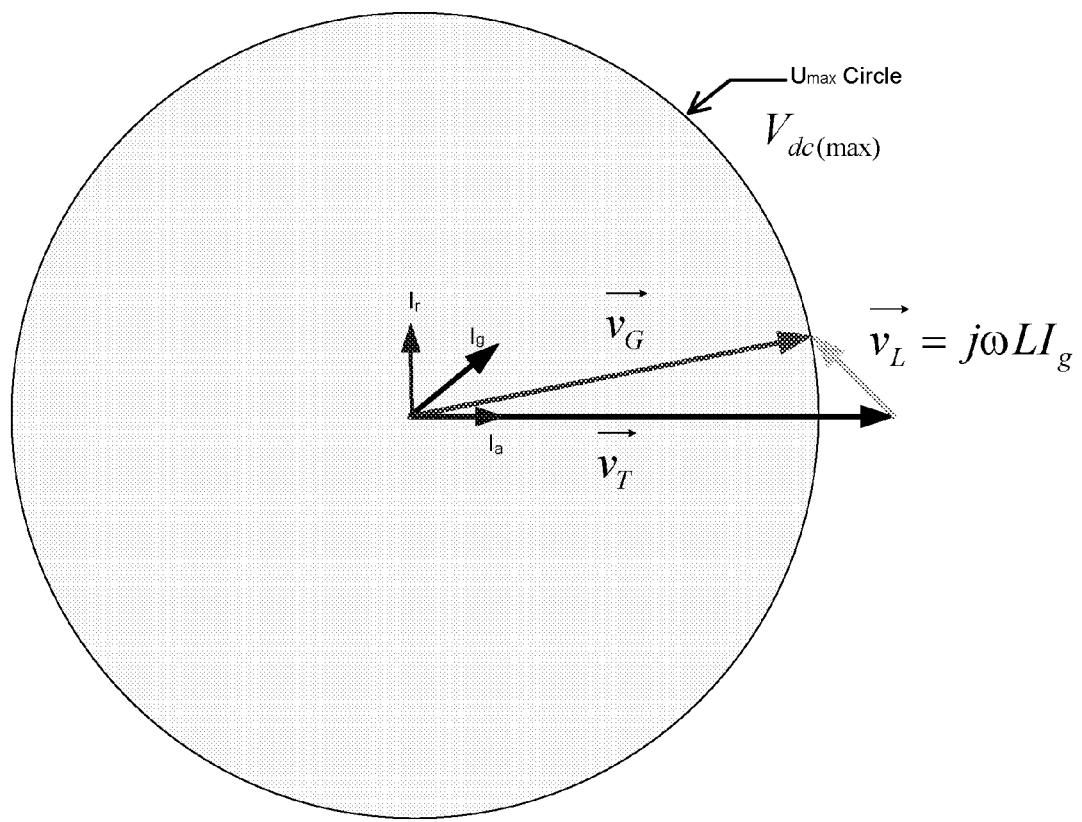
FIG. 3 is a vector diagram illustrating how a power converter control of a WTG handles an overvoltage by absorbing reactive power.

An overvoltage situation is shown in FIG. 3. Through an appropriate amount of reactive current $I_r$ with using the maximum capability of converter voltage and current limits, the voltage balance is ensured i.e. $v_G=v_L+v_T$. The circle in this figure corresponds to converter output voltage with maximum utilization of DC-link voltage i.e. operation at maximum possible modulation index at a given DC-link voltage.

Figure 4:
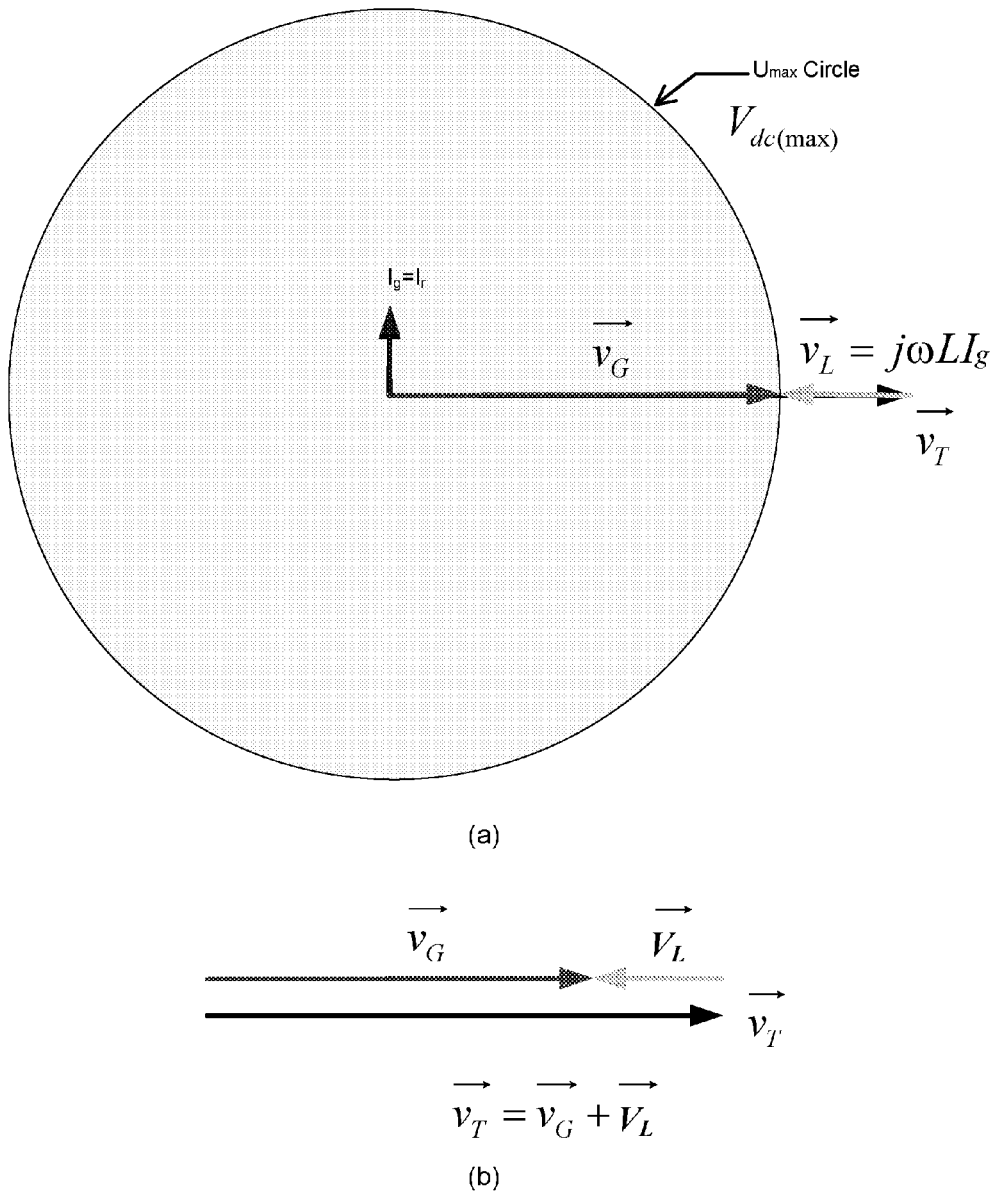
FIG. 4 is a vector diagram illustrating how a power converter control handles an overvoltage by absorbing maximum reactive power.

With increase in overvoltage $v_T$, the contribution of reactive current $I_r$ increases and active current $I_a$ decreases. Eventually, we reach a point where $I_a$ is zero and $I_r$ is equal to power converter rating. This situation is shown in FIG. 4 where $v_T=v_L+v_G$. This is the maximum overvoltage that can be accommodated by reactive power absorption and for a typical prior art WTG this voltage $v_T$ could be represented as $v_{Tmax}$. For example $v_{Tmax}$ could be of the order of 1.2-1.4 pu or beyond. This voltage limit may not be adequate to comply with the grid code related to overvoltage in some countries.

Figure 5:
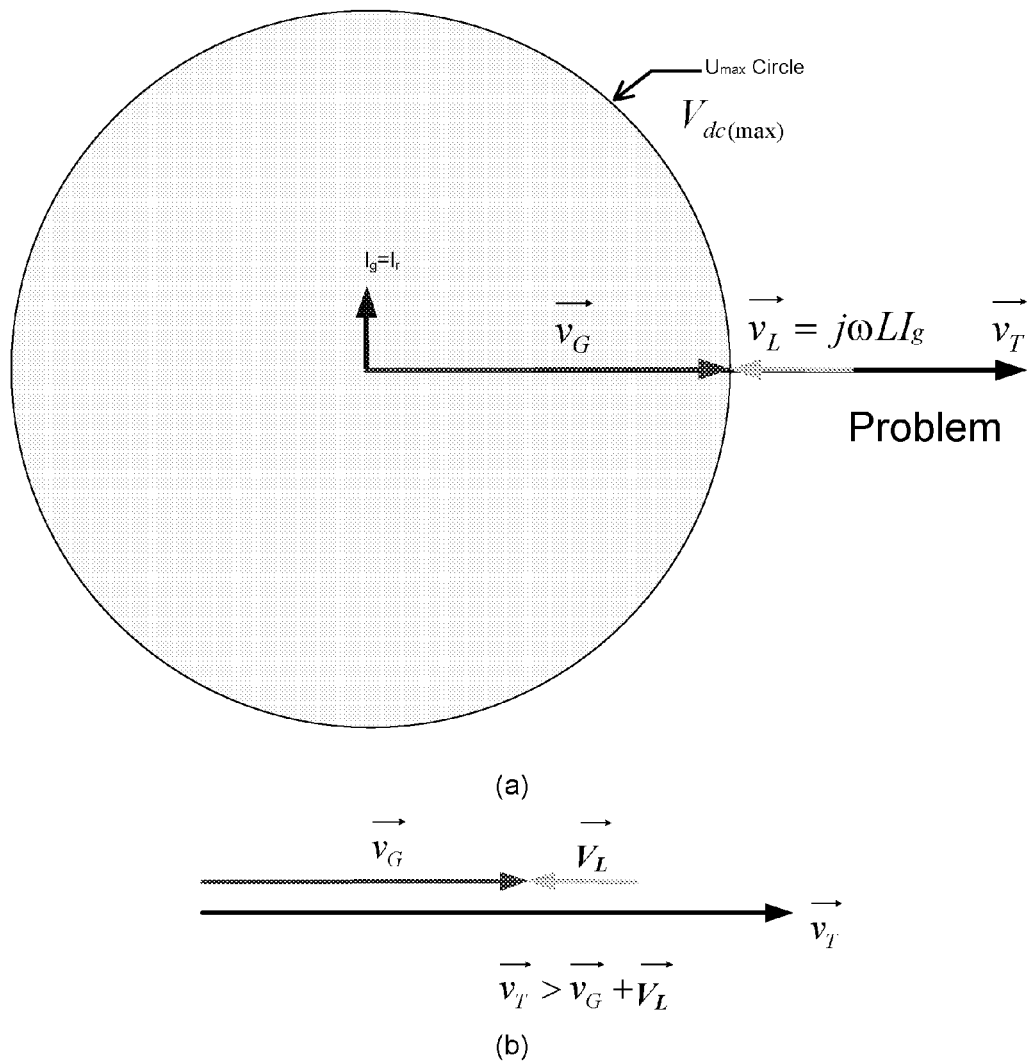
FIG. 5 is a vector diagram of an overvoltage event which can not be handled even by absorbing maximum reactive power.

The situation where $v_T > v_L + v_G$ is shown in FIG. 5. In this case the voltage balance may not be able to be maintained anymore and hence the converter control may be lost. This may lead to a sudden increase in DC-link voltage, power component damage and/or WTG tripping.

Figure 6:
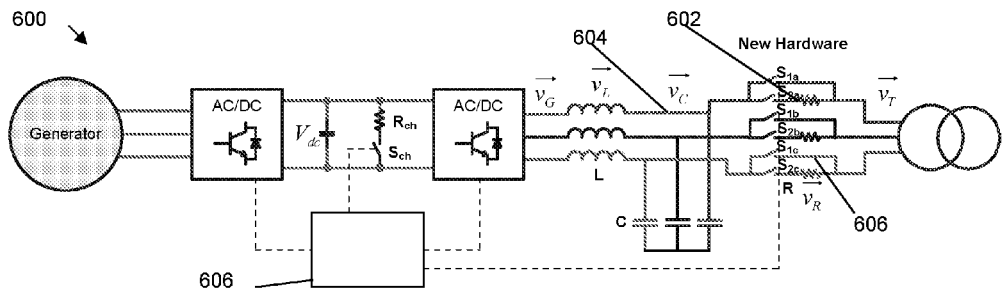
FIG. 6 is an electrical schematic of the drive train system for a full scale converter based WTG with an overvoltage handling hardware according to an embodiment.

To deal with higher overvoltage. FIG. 6 shows a WTG 600 according to an embodiment. A set of three series resistors 602 are connected in series with the filter output 604. A bypass switch 606 is provided for each resistor. It should be noted that bypass switches 606 [$S_{1a}$, $S_{1b}$, $S_{1c}$] are operated together with only one gating signal. Similarly, a set of series switches [$S_{2a}$, $S_{2b}$, $S_{2c}$], in series with the resistors 602, are operated together with only one gating signal. In normal condition switches [$S_{1a}$, $S_{1b}$, $S_{1c}$] are closed and switches [$S_{2a}$, $S_{2b}$, $S_{2c}$] are open, inclusive of overvoltage situation shown in FIG. 4. It should be noted that the bypass switches 606 [$S_{1a}$, $S_{1b}$, $S_{1c}$] and the series switches [$S_{2a}$, $S_{2b}$, $S_{2c}$] may be operated using more khan one gating signals in other embodiments.

In an embodiment, the WTG 600 includes a controller 606. The controller 606 controls the operation of the converters, the bypass and series switches [$S_{2a}$, $S_{2b}$, $S_{2c}$] [$S_{1a}$, $S_{1b}$, $S_{1c}$] and the load dump switch $S_{CH}$ 114 for each WTG.

The electrical system shown in FIG. 6 is a 3-phase system. For each phase, each resistor is connected in series between the filter output and the transformer to limit the voltage $v_C$ seen at the filter terminals through power converter operation i.e. even if voltage $v_T$ is very high, the voltage $v_C$ is within converter system design limits. Hence, these series resistors 602 can be called voltage limiting elements. The FIG. 6 shows the suggested location of these series resistors 602. However, they can be placed at other locations between grid side power converter and the transformer.

Figure 7:
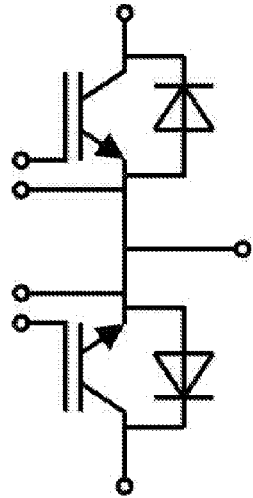
FIG. 7 is a circuit diagram of a switch (S1$a$, S1$b$, S1$c$, S2$a$, S2$b$ or S2$c$) in FIG. 6 according to an embodiment.

The switches 606 are bi-direction power semiconductor switches such as the one shown in FIG. 7 according to an embodiment. The transition from [$S_{1a}$, $S_{1b}$, $S_{1c}$] to [$S_{2a}$, $S_{2b}$, $S_{2c}$] or vice versa can be done in a few micro seconds and hence fast control is possible. The power electronic switch may be an IGBT, IGCT, thyristor etc. In most cases, all the switches [$S_{1a}$, $S_{1b}$, $S_{1c}$] can be switched on and off together using the same gating signal from the controller 606. For example in FIG. 7 the two IGBTs use the same gating signal, and the same applies to other two phases ($S_{1b}$ and $S_{1c}$). This is also applicable to [$S_{2a}$, $S_{2b}$, $S_{2c}$]. It should be noted that the bypass switches 606 [$S_{1a}$, $S_{1b}$, $S_{1c}$] and the series switches [$S_{2a}$, $S_{2b}$, $S_{2c}$] may be operated using more than one gating signal in other embodiments. Other arrangements are also possible. It should also be noted that series switches [$S_{2a}$, $S_{2b}$, $S_{2c}$] are optional and may be eliminated in other embodiments.

Figure 8:
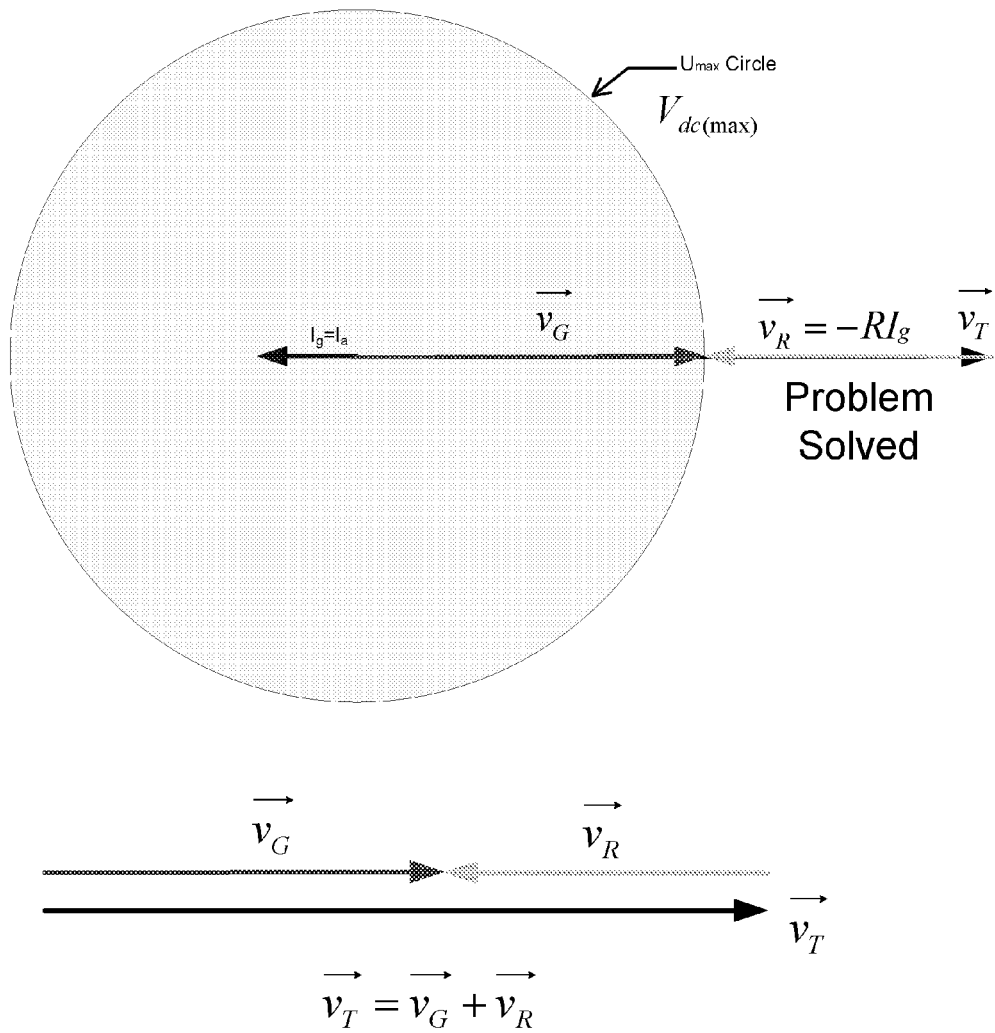
FIG. 8 is a vector diagram illustrating how the WTG in FIG. 6 handles a high overvoltage event.

For a voltage higher than shown in FIG. 4, the switches [$S_{1a}$, $S_{1b}$, $S_{1c}$] are open and switches [$S_{2a}$, $S_{2b}$, $S_{2c}$] are closed. By doing so, an additional resistance R is introduced between the grid and power converter. The operation of the converter to deal with high voltage is described in FIG. 8 and explained here. The converter control issues an active current reference command $I_a$ such that the voltage balance is ensured as shown in FIG. 8 i.e. FIG. 8 proposes to handle overvoltage by modifying the converter current control references. In FIG. 8 drop across L is significantly small as compared to R and hence ignored for the explanations here. Under this assumption, in the simplified case of FIG. 8, the controller will determine $I_a$ based on (1):

$$I_a = (V_T - V_G)/R \quad (1)$$

where $V_T$ is the line voltage, $V_G$ is the voltage output of the grid-side converter and R is the value of the series resistor. $I_a$ is the active current reference which is determined based on the overvoltage for a given value of the series resistor and converter control strategy.

The following conclusions can be drawn from (1): (i) current $I_a$ is inversely proportional to R. So the higher the value of R is, the smaller the value of $I_a$ and vice versa; (ii) for a given R, $I_a$ is directly proportional to ($V_T - V_G$). Hence, R and $I_a$ are designed considering extreme voltages. It can also be seen from (1) that for high overvoltage e.g. 2 pu or more, the ($V_T - V_G$) will also be high and this can be handled by selecting proper values of R and $I_a$.

During the grid fault conditions, not all the power from the electrical generator can be fed to the grid. Hence, the load dump resistor in the DC-link is used to temporarily absorb the excess active power. The controller will determine an appropriate duty ratio for activating the load dump resistor to keep the DC-link voltage within designed limits by absorbing the excess active power. During an overvoltage the current that flows into the dump resistor mainly comes from the active power from the electrical power generator. However, a small active current $I_a$ may also flow to the load dump resistor which is needed for the voltage balancing through the series resistors 602 as per FIG. 8.

Figure 9:
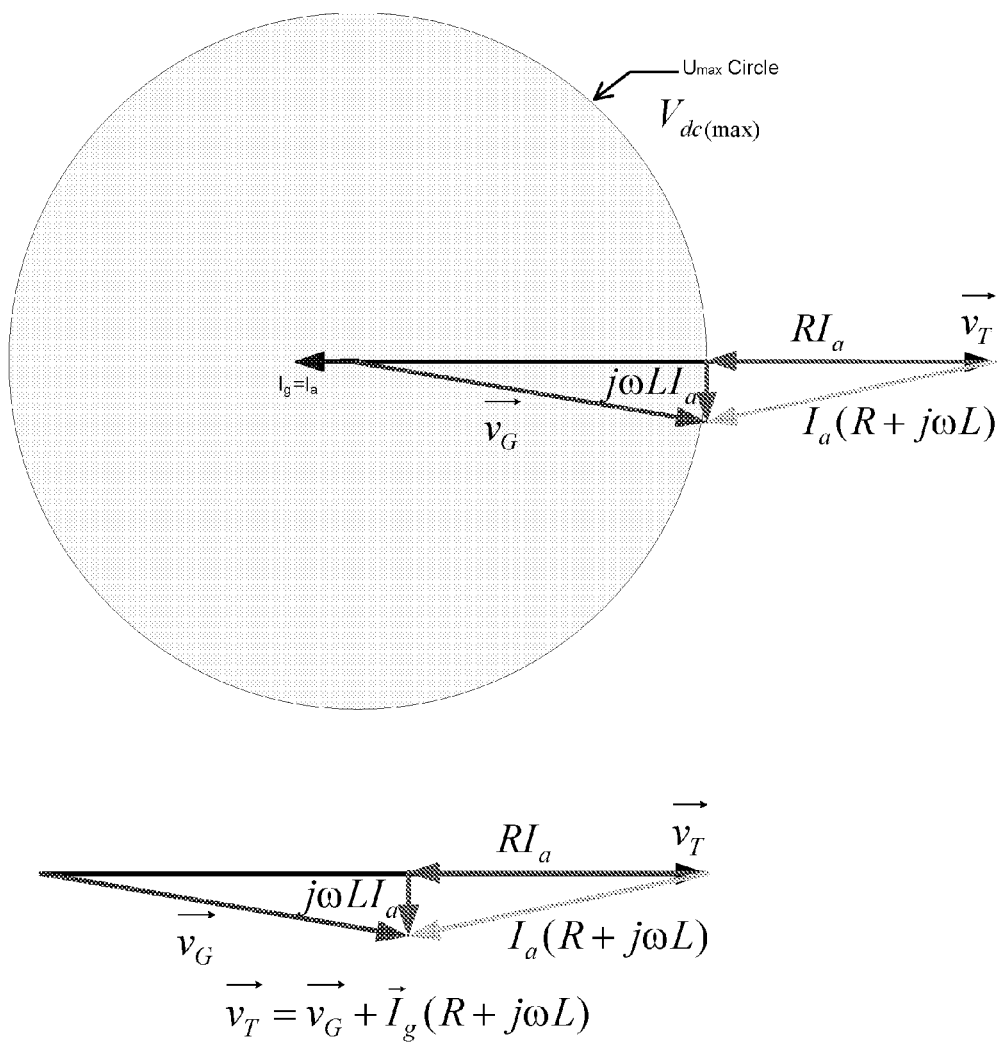
FIG. 9 is a vector diagram illustrating how the WTG in FIG. 6 handles a high overvoltage event including the voltage drop across grid choke.

However, if the drop across the grid choke L is included then the resultant figure is drawn in FIG. 9. The FIG. 9 can also be explained similar to FIG. 8.

Figure 10:
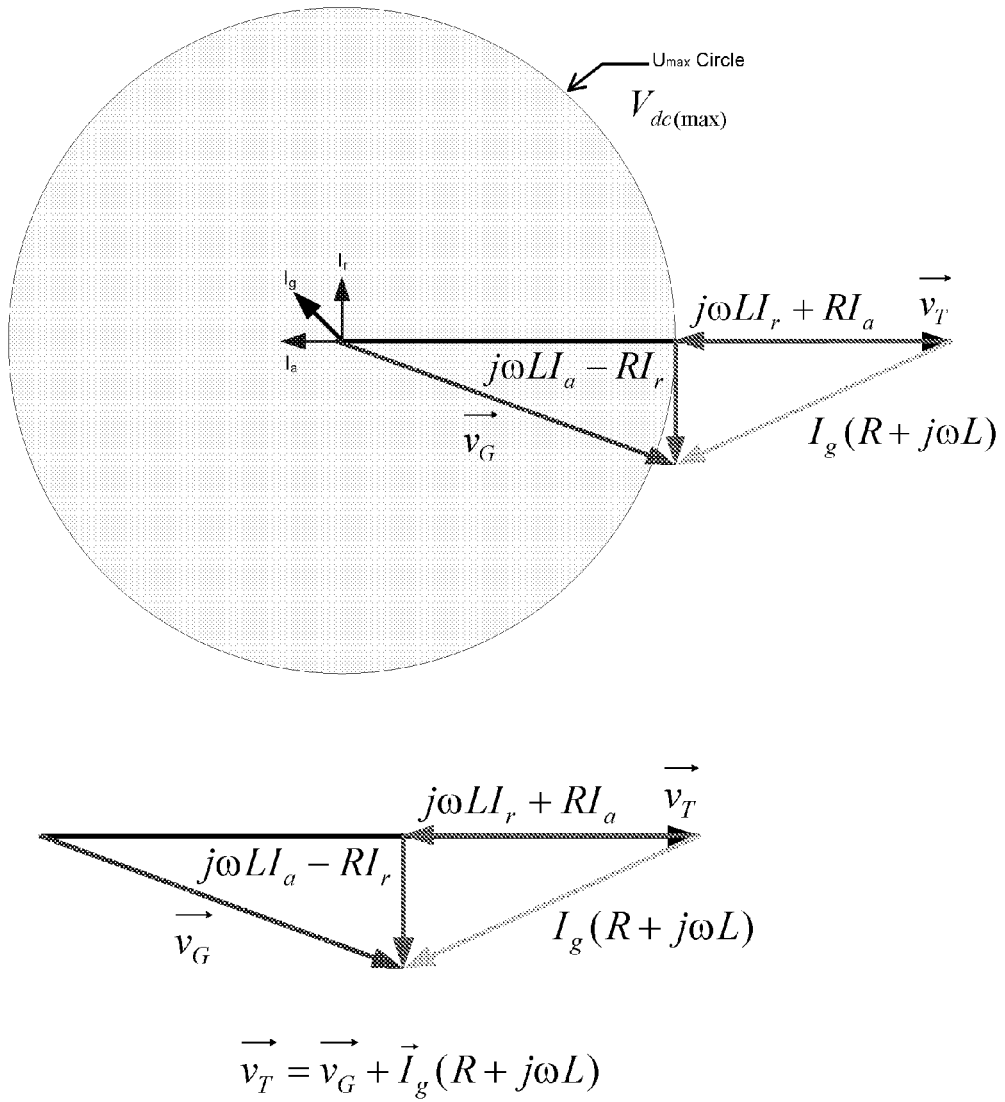
FIG. 10 is a vector diagram illustrating how the WTG in FIG. 6 handles a high overvoltage event through controlling both active and reactive current.

It is also possible to handle overvoltage through both active and reactive current as shown in FIG. 10. In this case, the $RI_a+j\omega LI_r$ is the voltage drop along the voltage $v_T$ where as $-RI_r+j\omega LI_a$ is the voltage drop perpendicular to the voltage vector $v_T$. The vector sum of $RI_a+j\omega LI_r$ and $-RI_r+j\omega LI_a$ is given as $I_g(R+j\omega L)$. The vector sum of voltage vector $v_T$ and voltage drop vector $I_g(R+j\omega L)$ will decide the voltage to be applied from the power converter. In this case the design of series resistor will be different from what is described for the above case i.e. (i) depending on the level of the overvoltage needs to be handled through drop across R and L, and the control strategy, the resistor will have a different value w.r.t. ohmic value and energy capacity. (ii) Depending on the control strategy and overvoltage to be handled the contributions of $I_a$ and $I_r$ will differ accordingly.

Figure 11:
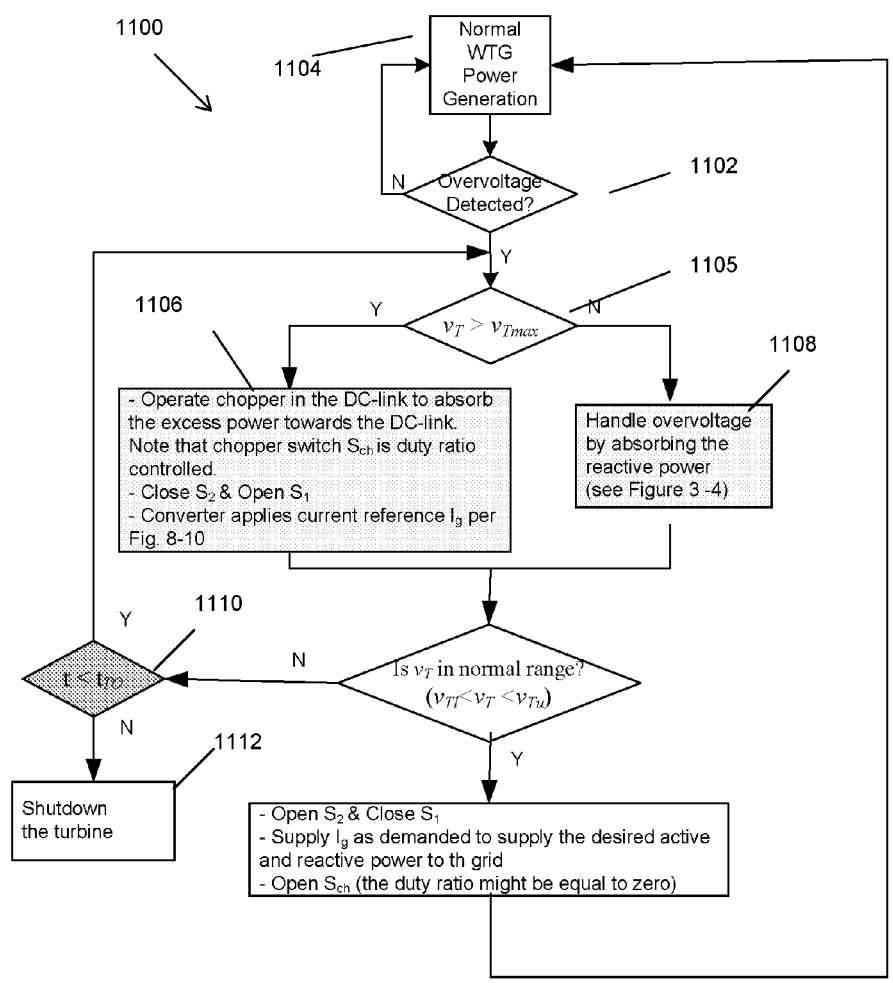
FIG. 11 is a flow diagram of the control strategy on handling an overvoltage event according to an embodiment.

The control variables in FIG. 11 are:

$I_a$: Active current reference which is determined based on the overvoltage that needs to be handled for a given value of the series resistor and control strategy.

$I_r$: Reactive current reference which is primarily determined based on the amount of overvoltage to be handled in dependence on the series resistor R, the current $I_a$ and the control strategy.

$I_g$: Total grid current which is a vector sum of $I_a$ and $I_r$ so $I_g$ is not an independent control variable. Take note that $I_g$ must never exceed the power converter current rating.

$\omega$: Angular frequency of the grid voltage.

Once $I_a$ and $I_r$ current references are determined they are provided to the grid side converter control (which may be the controller 606) which are used by the converter control algorithm and required voltage $v_G$ is produced by the converter which will eventually handle the grid overvoltage as described above with reference to FIGS. 8-10.

It should be noted that irrespective of the strategy described in FIG. 8-FIG. 10, the reactive current required by the filter capacitors bank C in FIG. 6 can be supplied from either converter or the grid. Accordingly, the reactive current requirement from the converter or the grid will be affected.

FIG. 11 shows a method 1100 for controlling the WTG according to an embodiment. When an overvoltage is detected 1102 the turbine shifts from the normal power generation mode 1104 to the overvoltage control mode. In the overvoltage control mode if $v_T>V_{Tmax}$ 1105 the controller inserts the series resistors 1106 and controls $I_g$ accordingly as described above in FIG. 8-FIG. 10. The voltage $v_{Tmax}$ depends on the power converter voltage and current rating. To avoid the DC link voltage rising above desired limits, the dump load resistor is connected to the DC-link at a duty cycle determined based on the active power to be dissipated.

In the overvoltage control mode if $v_T \leq v_{Tmax}$ 1104 the controller does not need to activate the series resistors 1108 but controls $I_g$ as described above with reference to FIGS. 3 and 4; effectively absorbing reactive power to control the overvoltage.

Figure 12:
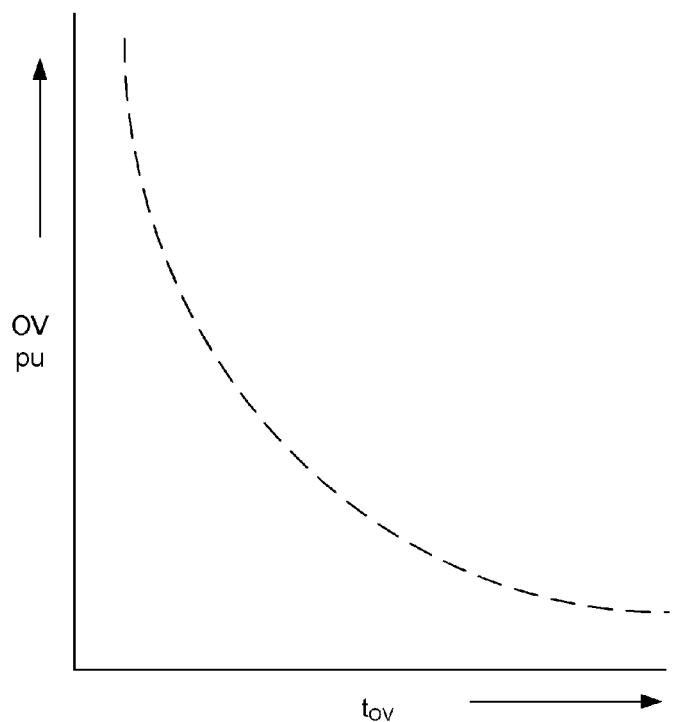
FIG. 12 is a graph of Overvoltage (pu) vs $t_{ov}$ showing when it is acceptable for the WTG to disconnect from the grid.

Typically an overvoltage lasts for a few tens to hundreds of milliseconds. Depending on the overvoltage level a waiting time $t_{OV}$ can be provided as shown in FIG. 12; typically the higher the overvoltage level, the shorter the waiting time. If the overvoltage is still present after the determined $t_{OV}$ 1110 then the turbine is instructed to shutdown 1112.

With the normal control strategy of a WTG, when an overvoltage exists in FIG. 5 the turbine must shut down because it cannot absorb anymore reactive power to lower the voltage within safe limits. In FIGS. 8 to 9, instead of absorbing reactive power, the grid side converter dictates a small current through the series resistors so that the voltage at the grid side converter or filter capacitor terminals is within a safe level. Accordingly, the system according to an embodiment is now capable of handling a high overvoltage.

Figure 15:
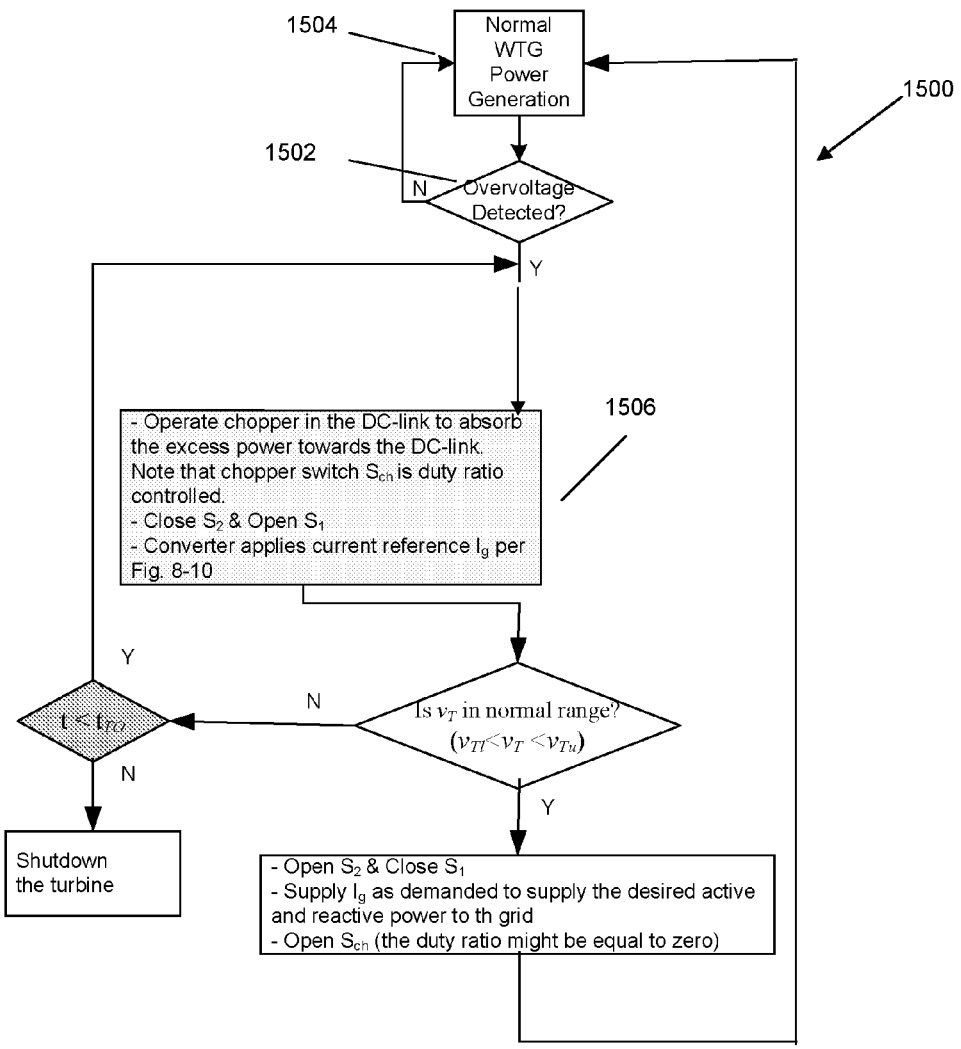
FIG. 15 is a flow diagram of the control strategy on handling an overvoltage event according to another embodiment.

FIG. 15 shows a method 1500 for controlling the WTG according to another embodiment. When an overvoltage is detected 1502 the turbine shifts from the normal power generation mode 1504 to the overvoltage control mode. In the overvoltage control mode the controller inserts the series resistors 1506 and controls $I_g$ accordingly.

Pre-Charge Operation

An additional advantage of using the resistor with bypass switches shown in FIG. 6 may be pre-charge operation of the DC-link capacitors. The pre-charge operation is required when the converter system is started. Hence, it can be seen that the resistors with bypass switches in FIG. 6 can be used for both the operations overvoltage handling (primary objective) and pre-charge operation (secondary objective).

Figure 13:
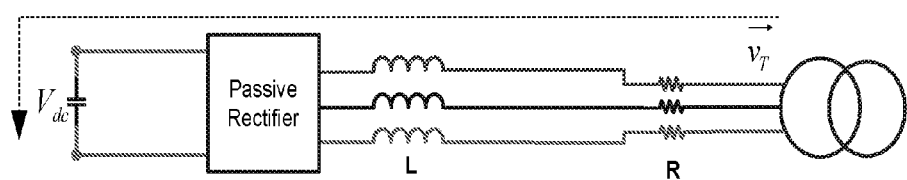
FIG. 13 is a schematic of a pre-charge operation of a DC-link capacitor according to an embodiment, FIG. 14 are waveforms for the pre-charge operation according to FIG. 13.
Figure 14:
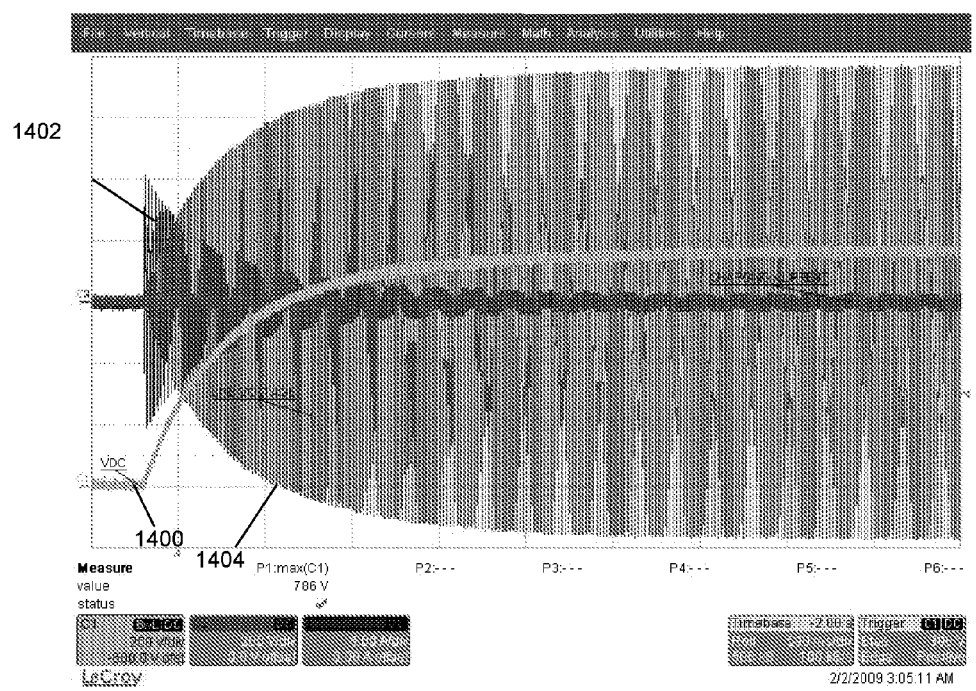

FIG. 13 shows a diagram illustrating the pre-charge operation of the DC-link capacitors. For this operation $[S_{1a}, S_{1b}, S_{1c}]$ are open and $[S_{2a}, S_{2b}, S_{2c}]$ are closed. The pre-charge operation i.e. charging of the DC-link capacitors happens through the resistors, choke and grid rectifier. Take note that the power switches of the grid-side converter are off (only reverse diode are participating in the pre-charge operation) and machine side converter does not play any role in this operation. FIG. 14 shows the waveforms for this operation. The DC-link voltage 1400 and the current 1402 flowing between the converter and the rectifier voltage 1404 are shown during the pre-charge operation lasting for a few seconds.

While embodiments of the invention have been described in detail, many variations are possible within the scope of the invention as claimed as will be clear to a skilled reader. For example actual design of the resistors eg: ohmic value and energy capacity, depends primarily on performance required for temporary overvoltage handling and secondly the pre-charge operation for a given system.

One or more embodiments may have the advantage that:
This proposal can handle high overvoltages (2 pu or more) with a simple solution;
Only two interface signals from the controller are required to operate the proposed resistor and bypass switch system. However, more than two interface signals may be used if required;
None of the power components may face the high over voltages so they remain protected; and/or
Power converter does not lose control so as soon as the overvoltage diminishes the power production can be resumed.

The invention claimed is:
1. A system for a wind turbine generator comprising:
a set of voltage limiting elements, and
a controller configured to bypass the voltage limiting elements when a line voltage is below a predetermined overvoltage threshold, and the controller is configured to, when the line voltage is above the predetermined overvoltage threshold:

connect each voltage limiting element in series between a grid side converter and a turbine transformer of the wind turbine generator, and determine a current control reference signal for controlling the grid side converter to generate a determined current.

2. The system in claim 1 wherein the controller is configured to determine the current control reference signal according to at least one of an impedance of the voltage limiting elements, the line voltage, a grid side converter voltage and a grid frequency.

3. The system in claim 1 wherein the controller is configured to shut down the wind turbine generator upon determining that the line voltage is above the predetermined overvoltage threshold for longer than a predetermined period.

4. The system in claim 1 wherein each voltage limiting element comprises a resistor in parallel with a bypass switch.

5. The system in claim 4 wherein each voltage limiting element further comprises a switch in series with the resistor.

6. The system in claim 5 wherein the controller is configured to open the bypass switch and close the switch in series with the resistor when the line voltage is above the predetermined overvoltage threshold.

7. The system in claim 5 wherein the wind turbine comprises multiple phases, wherein gate terminals of series switches in the phases are coupled together and gate terminals of bypass switches in the phases are coupled together, and wherein the bypass switches are configured to simultaneously operate using one gating signal and the series switches are configured to simultaneously operate using one switching signal.

8. A wind turbine generator comprising:
an electrical generator configured to generate AC signals;
a generator side convertor configured to convert or rectify the AC signals from the AC generator to DC signals to a DC-link,
a grid side converter configured to convert the DC signals from the DC-link to a fixed frequency AC signal,
a turbine transformer configured to transform the fixed frequency AC signals to a suitable voltage level, and
a system comprising:
a set of voltage limiting elements; and
a controller configured to bypass the voltage limiting elements when a line voltage is below a predetermined overvoltage threshold, and the controller is configured to, when the line voltage is above the predetermined overvoltage threshold:
connect each voltage limiting element in series between the grid side converter and the turbine transformer of the wind turbine generator, and determine a current control reference signal for controlling the grid side converter to generate a determined current; wherein each voltage limiting element is placed between the grid side converter and the turbine transformer.

9. The wind turbine generator in claim 8 wherein the controller is configured to supply reactive currents required by a filter capacitor bank between the grid side converter and the turbine transformer either by the grid side converter or an electrical grid.

10. The wind turbine generator in claim 8 further comprising a dump load resistor, and the controller is configured to connect the dump load resistor to the DC-link according to a duty cycle determined based on a power to be dissipated when the line voltage is above the predetermined overvoltage threshold.

11. A method of controlling a wind turbine generator comprising:
determining if there is an overvoltage;
if there is an overvoltage over a predefined threshold:
providing an open signal to a set of resistor bypass switches, thereby connecting a set of resistors between a power converter of the wind turbine generator and a grid; and
determining a current control reference signal for controlling the power converter to deliver a determined current, thereby allowing the wind turbine generator to remain connected to the grid throughout the overvoltage.

12. The method of claim 11 further comprising providing a pulse width modulated drive signal to a load dump resistor switch when it is determined during the overvoltage that there is an excess of active power which cannot be delivered to the grid.

13. The method of claim 11 further comprising providing a complementary close signal to a set of series resistor switches simultaneously with the open signal.

14. The method of claim 11 wherein the current control reference signal is at least one of an active and a reactive current control reference signal.

15. The method of claim 11 further comprising determining a reactive current control reference signal to control the overvoltage by absorbing reactive power if the overvoltage is between a lower threshold and a maximum threshold.

16. The method of claim 11 wherein the current control reference signal is determined based on at least one of the overvoltage, a voltage limiting impedance value, a grid side converter voltage and a grid frequency.

* * * * *